April 14, 1964 D. F. SEEMANN 3,129,289

ELECTRONIC LINE CIRCUIT

Filed June 26, 1959

*INVENTOR.*
D.F. SEEMANN

BY [signature]
ATTORNEY

United States Patent Office 3,129,289
Patented Apr. 14, 1964

3,129,289
ELECTRONIC LINE CIRCUIT

Donald F. Seemann, Joliet, Ill., assignor to International Telephone and Telegraph Corporation, New York, N.Y., a corporation of Maryland
Filed June 26, 1959, Ser. No. 823,209
10 Claims. (Cl. 179—18)

This invention relates to line circuits for use in telephone systems and more particularly to electronic line circuits.

A "line circuit" is used in telephone systems to indicate whether subscriber stations are or are not off-hook and to mark idle subscriber lines as available to switching equipment. Sometimes line circuits are also adapted to provide lockout by marking associated subscriber lines to prevent needless operations of switching equipment in an effort to serve non-existing calls. Examples of conditions requiring lockout are: shorted tip and ring conductors, improperly replaced handsets, calls which are disconnected by conversation timing means, etc.

In the past, most telephone switching systems have used electromechanical equipment and the functions of line circuits have been provided by means of relay circuitry. Much of the present-day development of telephone switching systems for future use has been directed toward electronic switching means. During the transition from electromechanical switching systems to electronic switching systems there will be many problems centered about adapting existing electromechanical equipment to a method of control which is compatible with the control of electronic equipment. Since line circuits are control circuits, there is a need for a line circuit which converts signals to control either eletromechanical or electronic equipment.

An object of this invention is to provide new and improved line circuits.

Another object of this invention is to provide electronic line circuits which may be used with either electromechanical or electronic switching systems.

Still another object of this invention is to provide electronic line circuits including lockout means.

In accordance with this invention, conventional closed loop seizure signals are transmitted when hookswitch contacts are closed responsive to the removal of a receiver or handset. An electronic circuit is connected to detect such closed loop signals and respond thereto by transmitting a signal which may operate either electromechanical or electronic switching equipment. When such equipment operates, it is conventional to return a signal which holds preceding equipment and provides a busy marking or guarding potential to prevent double seizure. A memory device is connected to become conductive responsive to such return signal, thereby "remembering" the occurrence of the off-hook or calling condition. If a calling subscriber dials within a predetermined period of time, switching equipment is operated in a conventional manner. If a calling subscribed does not dial within a predetermined period of time, the operated switching equipment times-out and releases. The line circuit is now in lock-out since the signal which is adapted to operate the switching equipment is shunted to ground through the conductive memory device. When the original closed loop calling condition terminates, the memory device ceases to conduct. Thereafter, the line circuit is ready to respond to the next call.

The above mentioned and other objects of this invention together with the manner of obtaining them will become more apparent and the invention itself will be best understood, by making reference to the following description of an embodiment of the invention taken in conjunction with the accompanying drawings in which.

Figure 1:
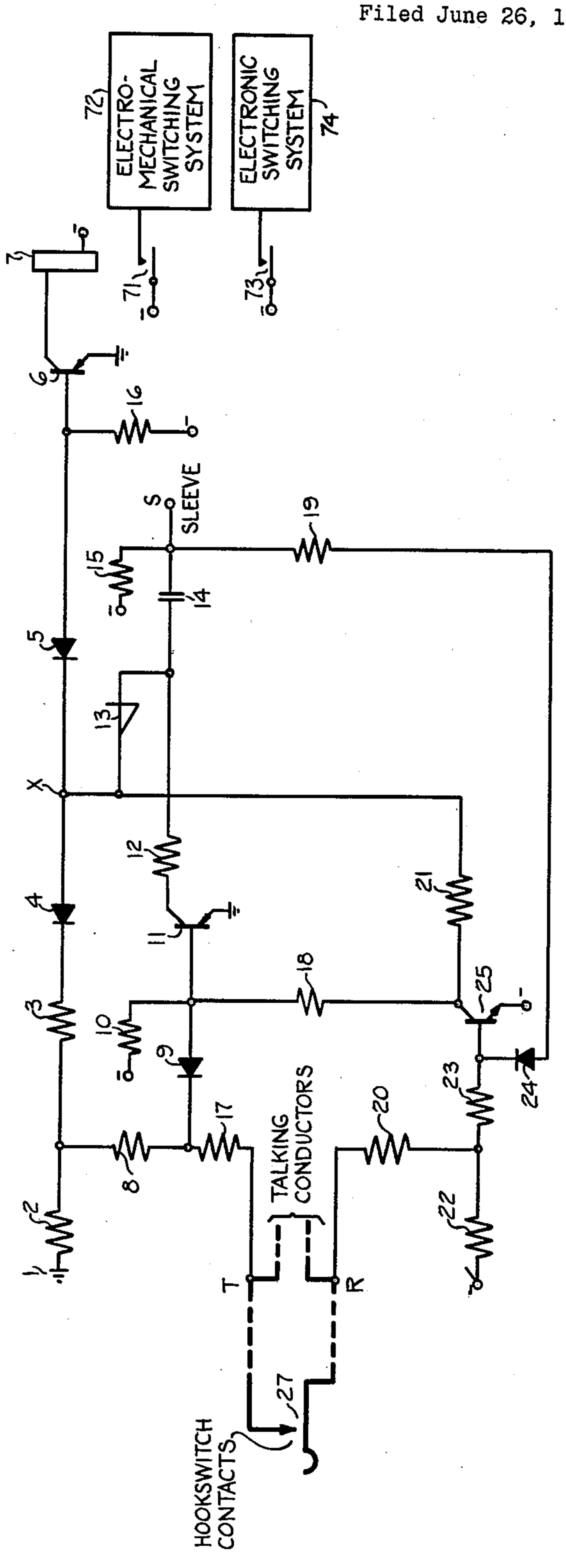
FIG. 1 shows an all electronic line circuit.

Where possible, simple terms are used and specific items are described hereinafter to facilitate an understanding of the invention; however, it should be understood that the use of such terms and references to such items are not to act in any manner as a disclaimer of the full range of equivalents which is normally given under established rules of patent law. For example, FIG. 1 shows semiconductors of the P-N-P type and the N-P-N type; whereas, any suitable devices may be used, such as gas tubes, magnetic amplifiers, and the like. Moreover, the subject drawing shows memory devices in the form of four layer diode 13 and relay 30; whereas, any suitable memory device may be used. Quite obviously, other examples could be selected to illustrate the manner in which the terms that have been used and the items which have been described are entitled to a wide range of equivalents.

*Brief Description*

When a subscriber at a station on the line attached to terminals T and R removes a handset or a receiver, hookswitch contacts 27 close to complete a loop across the talking conductors, thereby turning-on transistors 11 and 25 which have complementary symmetry. Responsive thereto, a start signal is sent to turn-on transistor 6 and to operate any suitable relay or other device 7, thus starting a finder operation in either electromechanical automatic switching equipment 72 or in electronic automatic switching equipment 74. Any suitable memory device, such as four layer diode 13, is rendered conductive responsive to such finder operation to "remember" the occurrence of the seizure signal. If the closed loop signal is not followed by dial pulses within a predetermined period of time, the finder times-out. Transistor 6 may not be turned-on again responsive to the same off-hook signal since conductive four layer diode 13 in effect shunts the seizure signal to ground.

Figure 2:
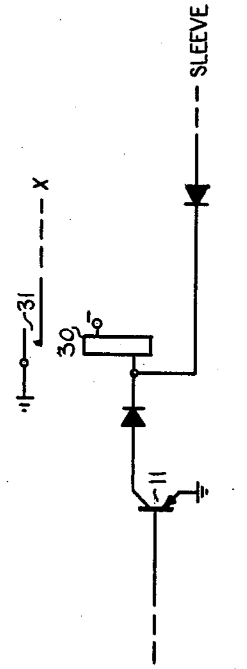
FIG. 2 shows a combined electronic and relay line circuit.

The embodiment of FIG. 2 provides the same effect since relay 30 operates contacts 31 to shunt seizure signals to ground which might otherwise be applied to the base of transistor 6.

*Detailed Description*

A subscriber line includes hookswitch contacts 27 and two talking conductors which attach to terminals T and R in the left-hand portion of FIG. 1. When a subscriber removes a receiver or a handset, hookswitch contacts 27 close to complete a loop across condutors T and R. A circuit may now be traced from ground 1 through resistances 2, 8, 17, conductor T, the line extending to hookswitch contacts 27, and return over conductor R, through resistances 20, 23, and the base of transistor 25, to battery on the emitter. Transistor 25 becomes conductive.

Also responsive to the removal of the handset and resulting closure of hookswitch contacts 27, a circuit may be traced from battery through resistances 22, 20, conductor R, hookswitch contacts 27, conductor T, resistances 17, 8, 3, diode 4, diode 5, and the base electrode of transistor 6 to ground on the emitter thereof. Responsive thereto, transistor 6 becomes conductive and a low resistance circuit may be traced from ground through transistor 6 and the winding of relay 7 to battery. Relay 7 is shown merely to represent any suitable means for initiating an action as by closing contacts 71 or 73, for example.

Still further responsive to the closure of hookswitch contacts 27, a circuit may be traced from battery through resistance 22, resistance 20, conductor R, contacts 27, conductor T, resistance 17, diode 9 and the base of transistor 11 to ground on the emitter. Transistor 11 is rendered conductive responsive to the flow of current through the above traced circuit. Thereafter, a charging current flows from ground through transistor 11, resistance 12, capacitance 14, and resistance 15 to battery.

A finder responds to the operation of relay 7 in any well known manner. Upon completion of the finder operation, equipment (not shown) returns a ground marking to sleeve terminal S. Capacitor 14 discharges responsive to such application of sleeve ground, thereby causing a surge current or "kick" to be extended from the left-hand side of capacitor 14 through four layer diode 13. The "kick" is sufficient to cause four layer diode 13 to become conductive. After termination of the "kick," the internal characteristics of the four layer diode are such that it continues to conduct responsive to the relatively low level of current flowing from ground through transistor 11, resistance 12, diode 13, resistance 21 and through transistor 25 to battery.

When four layer diode 13 is in a conductive state, a low resistance circuit may also be traced from ground through transistor 11, resistance 12, four layer diode 13, point "X," diode 4, resistance 3, resistance 8, resistance 17, conductor T, hookswitch contacts 27, conductor R, resistances 20 and 22 to battery. Point "X" is now at substantially ground potential and transistor 6 is biased to cut-off.

Dial tone is returned and a calling subscriber may respond by transmitting switch directing signals in any suitable manner—as from a standard telephone dial, for example. It should be noted that when the finder returns sleeve ground to terminal S, a potentional is extended through resistance 19 and diode 24 to hold transistor 25 in an "on" condition independently of the loop that is completed across talking conductors T and R at hookswitch contacts 27. Moreover, the output of transistor 25 is fed through resistance 18 to hold transistor 11 in an "on" condition and through resistance 21 to maintain current through four layer diode 13. Therefore, the line circuit no longer depends upon the continuity of current in the talking loop and the dial (not shown) may transmit conventional open loop pulses without releasing the line circuit. Furthermore, on calls to an operator, a subscriber may flash a recall signal by actuation of hookswitch contacts 27 to break the loop.

The circuit through resistance 19 and diode 24 also controls the line circuit when a connector grounds terminal S on incoming calls.

On the other hand, it is also possible that the calling condition was not caused by a subscriber removing a handset to close contacts 27, but rather was caused by a permanent signal or other fault condition which simulated a loop across conductors T and R, as for example, a low resistance insulation fault, and improperly replaced handset, or a foreign potential. Therefore, means (not shown) is provided in the switching equipment for measuring a predetermined period of time. If dial signals are not received within such period of time, the finder times-out and releases; whereupon, ground is removed from terminal S.

As long as the original closed loop condition continues, four layer diode 13 continues to be in a conductive state; therefore, even though an off-hook condition still exists on the line, the biasing potential for turning-on transistor 6 is shunted from point "X" through the low resistance of conductive four layer diode 13 to ground on the emitter of transistor 11. When the trouble on the line clears, the loop across conductors T and R is broken and transistors 11, 25 and four layer diode 13 cease to conduct, ground potential is removed from point "X," and the equipment is ready to serve the next call.

Resistances 2, 8 and 22 should be low in comparison to resistances 17 and 20 to provide voltage dividers having characteristics which will protect transistors 11 and 25 from lightning, ringing potentials and the like by limiting potentials applied to the base electrodes thereof. While the relationship between the various resistances may assume any suitable proportions, it has been found that there may be satisfactory results when the high resistance sides of the voltage dividers have a resistance which is about 200 times as great as that of the low resistance sides.

FIG. 2 shows an embodiment of the invention in which four layer diode 13 is replaced by relay 30. The circuit is as shown in FIG. 1 except that the collector of transistor 11 is connected through the winding of relay 30 to battery. When transistor 11 is rendered conductive, as explained above, relay 30 operates and contacts 31 close and apply ground potential to point "X" thereby biasing transistor 6 to cut-off. Relay 30 is held operated until the end of the off-hook calling condition to prevent further response by transistor 6. In FIG. 1, capacitor 14, resistances 12, and 15 are provided to establish the electrical values which are required by four layer diode 13. All of these components may be eliminated when the relay of FIG. 2 is used.

Thus, it is seen that the subject drawing shows an electronic line circuit which responds to closed loop conditions to initiate either electronic or electromechanical switching. Responsive thereto, a memory device such as four layer diode 13 or relay 30 applies a biasing potential to point "X" to prevent further operation responsive to the same closed loop condition. Otherwise, the switching equipment might cycle until termination of the closed loop condition, i.e. a finder may repeatedly operate, time-out and reoperate.

While the principles of the invention have been described above in connection with specific apparatus, it is to be clearly understood that this description is made only by way of example and not as a limitation to the scope of the invention.

I claim:

1. An electronic line circuit comprising a pair of line conductors, a pair of transistors having complementary symmetry, one of said line conductors being coupled to apply biasing potential to one of said transistors, the other of said line conductors being coupled to apply biasing potential to the other of said transistors, means for switching said transistors between non-conductive and conductive states responsive to the completion or interruption of a loop across a pair of conductors, and means responsive to said switching of said transistors to one of said conductive states for extending a seizure signal to operate a telephone system.

2. The line circuit of claim 1 and means connected in parallel with each of said transistors for limiting said biasing potentials.

3. The line circuit of claim 1 and means responsive to operation of said telephone system for returning a signal to provide lockout.

4. The line circuit of claim 3 wherein said lockout is provided by means of a four layer diode connected to be rendered conductive responsive to said returned signal.

5. The line circuit of claim 3 wherein said lockout is provided by means of a relay connected to operate responsive to said returned signal.

6. The line circuit of claim 1 and means responsive to operation of said telephone system for returning a signal to hold said transistors in said one conductive state, whereby said loop condition may be changed for signalling purposes.

7. An electronic line circuit comprising a pair of talking condutors, means including a pair of transistors of complementary symmetry connected to be rendered conductive responsive to closed loop conditions on said talking conductors, one of said talking conductors being coupled to apply biasing potential to one of said transistors, the other of said talking conductors being coupled to apply biasing potential to the other said transistor, means including a third transistor connected to be rendered conductive responsive to output current extended from at least one of said pair of transistors, means responsive to said last named means for operating electrical equipment, memory means, means responsive to said operation of said electrical equipment for turning-on said memory means, and means responsive to said last named means for shunting said output current to prevent said third transistor from being rendered conductive thereafter.

8. The electronic line circuit of claim 7 and means for maintaining said memory means in an "on" condition as long as said closed loop condition shall continue, thereby preventing more than one operation of said electrical equipment responsive to the same closed loop condition.

9. The electronic line circuit of claim 8 wherein said memory means comprises a four layer diode.

10. The electronic line circuit of claim 7 and means connected in parallel with said pair of transistors for limiting the charges applied thereto from said line.

References Cited in the file of this patent

UNITED STATES PATENTS

| | | |
|---|---|---|
| 2,291,752 | Parker | Aug. 4, 1942 |
| 2,785,229 | Faulkner | Mar. 12, 1957 |
| 2,829,203 | Pitlik | Apr. 1, 1958 |
| 2,831,064 | Faulkner | Apr. 15, 1958 |
| 2,835,740 | Heetman | May 20, 1958 |
| 2,921,140 | Abbott | Jan. 12, 1960 |
| 2,951,125 | Andrews | Aug. 30, 1960 |
| 2,959,642 | Dubuar | Nov. 8, 1960 |
| 3,027,427 | Woodin | Mar. 27, 1962 |
| 3,029,315 | Radcliffe et al. | Apr. 10, 1962 |